(No Model.)
F. DIETZ.
TUBULAR LANTERN.
No. 500,381. Patented June 27, 1893.
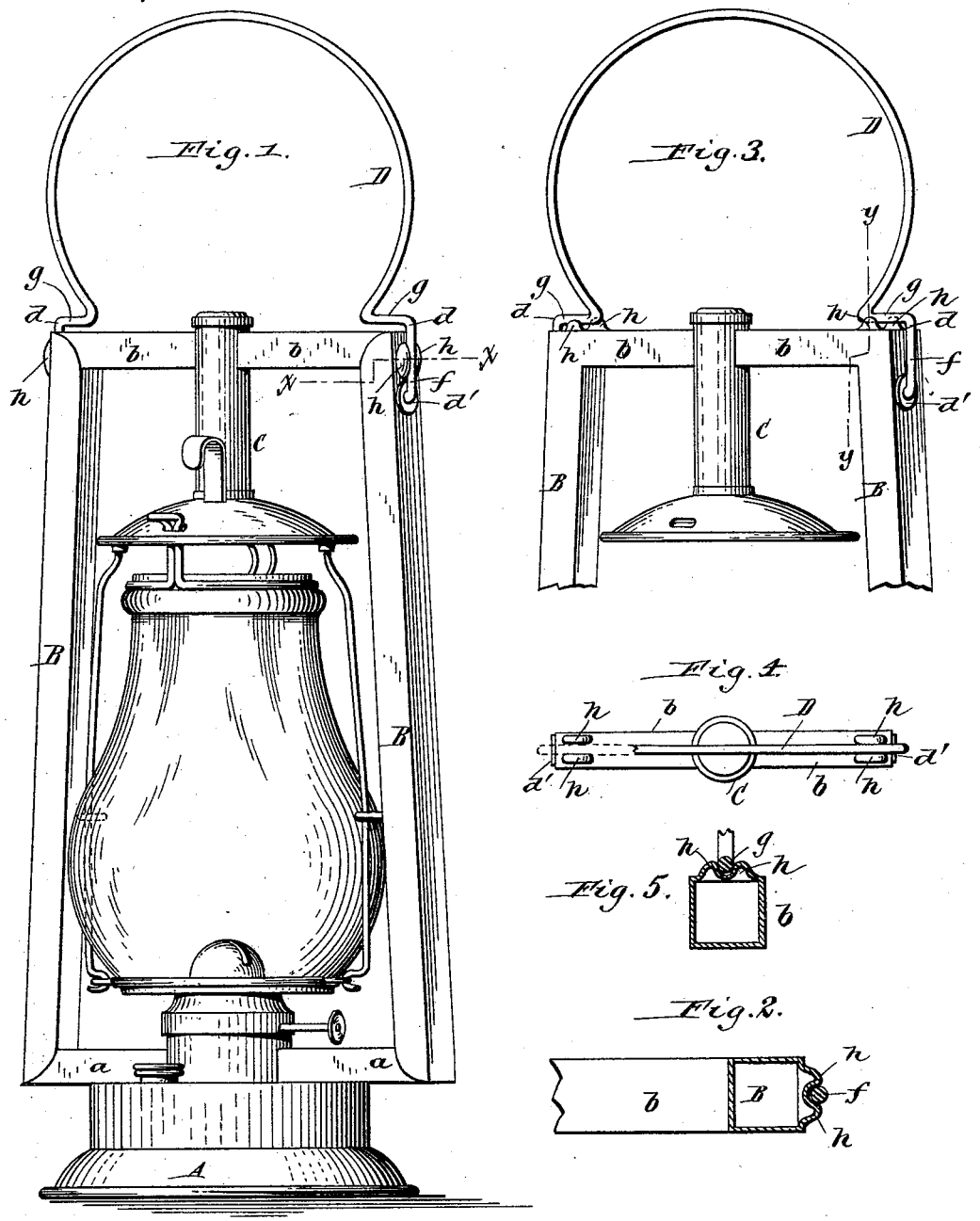

UNITED STATES PATENT OFFICE.

FREDERICK DIETZ, OF NEW YORK, N. Y., ASSIGNOR TO THE R. E. DIETZ COMPANY, OF SAME PLACE, AND THE STEAM GAUGE AND LANTERN COMPANY, OF SYRACUSE, NEW YORK.

TUBULAR LANTERN.

SPECIFICATION forming part of Letters Patent No. 500,381, dated June 27, 1893.

Application filed September 14, 1891. Serial No. 405,568. (No model.)

*To all whom it may concern:*

Be it known that I, FREDERICK DIETZ, a citizen of the United States, residing at New York, in the county and State of New York, have invented a new and useful Improvement in Tubular Lanterns, of which the following is a specification.

This invention relates to a device for holding the bail of the lantern in an upright position so that when the bail is released it will not drop down of its own weight but will require the exertion of a slight pressure to swing it down. It is usually a matter of some difficulty to hang a lantern to a nail or hook over head, because the bail drops down as the lantern is raised up to place the bail over the hook or nail.

The object of this invention is to make this operation easy and convenient.

In the accompanying drawings: Figure 1 is an oblique side elevation of a tubular lantern provided with my improvements. Fig. 2 is a horizontal section in line $x$—$x$ Fig. 1 on an enlarged scale. Fig. 3 is an oblique side elevation of the upper part of a tubular lantern showing a slightly modified construction of my improvement. Fig. 4 is a top plan view thereof showing the bail partly broken away. Fig. 5 is a vertical section in line $y$—$y$ in Fig. 3 on an enlarged scale.

Like letters of reference refer to like parts in the several figures.

A represents the base of the lantern, $a$ the horizontal lower branches, B the upright side portions and $b$ the horizontal top branches of the air tubes, and C the depending central tube, forming together the tubular lantern frame.

D represents the bail which is hung to the upper parts of the side portions of the air tubes, its ends $d$ being turned inwardly and sprung or hooked into eyelets or sockets $d'$ secured in the outer walls or backs of the side portions B of the air tubes near their upper ends. The bail extends from its pivotal ends $d$ along the outer sides or backs of the side portions of the air tubes, forming straight upright arms $f$, thence inwardly over the top branches $b$ of the air tubes, forming horizontal arms $g$ and thence in the form of of an arch or bow from one side of the frame to the other.

$h\ h$ Figs. 1 and 2 represent a pair of projections or ribs formed on the back or outer wall of the upright portions of each air tube between the point at which the bail is attached thereto and the top of the tube. These projections are separated by a depression into which the upright arm $f$ of the bail engages by reason of the elasticity of the bail when the latter stands in an upright position. These projections are rounded in cross section so that by exerting a slight pressure against the bail in a forward or backward direction the upright arms of the bail can be sprung out of the depressions between the projections, leaving the bail free to drop down against the side of the globe. When the lantern is carried by the bail, the latter is engaged in the spaces between these projections and upon setting the lantern down the bail is retained in an upright position by these projections, so that the lantern can be readily hung by the bail to a nail, hook or other support arranged over head. The bail is readily swung down against the side of the globe when desired, for instance, for packing the lantern for shipment. The locking projections are formed integral with the tubular frame by stamping the same out of the tin or other sheet metal of which the lantern tubes are formed.

In the construction represented in Figs. 3, 4, and 5 the locking projections are formed on the upper sides of the top branches $b$ of the air tubes and the horizontal arms $g$ of the bail engage between the same.

It is obvious that the particular form of the bail is immaterial so long as the bail is provided with portions or arms which engage between the locking projections on the lantern frame.

I claim as my invention—

In combination, in a lantern the air tubes and the bail, said air tubes having projections to receive the bail between them, formed by forcing the metal of the outer wall of said air tubes outwardly, substantially as described.

Witness my hand this 16th day of July, 1891.

FREDERICK DIETZ.

Witnesses:
I. J. ALLEN,
FRED VAN DUYN.